United States Patent [19]

Funke

[11] 4,202,690
[45] May 13, 1980

[54] SETTING AND CONTROLLING DESIRED REDOX POTENTIALS IN GASES

[75] Inventor: Peter Funke, Rodenbach, Fed. Rep. of Germany

[73] Assignee: Alkem GmbH, Hanau, Fed. Rep. of Germany

[21] Appl. No.: 839,016

[22] Filed: Oct. 3, 1977

[30] Foreign Application Priority Data

Dec. 6, 1976 [DE] Fed. Rep. of Germany ....... 2655206

[51] Int. Cl.² .............................................. B22F 3/12
[52] U.S. Cl. .................................................... 75/224
[58] Field of Search .......................................... 75/224

[56] References Cited

U.S. PATENT DOCUMENTS 2,543,708  2/1951  Rice ....................................... 75/224

OTHER PUBLICATIONS

*Powder Metallurgy Equipment Manual,* 4-15-77, pp. iii, 152-160.

Hirschorn, Introduction to Powder Metallurgy (1969) APMI pp. 217-219, 226-230.

*Primary Examiner*—Brooks H. Hunt
*Attorney, Agent, or Firm*—Herbert L. Lerner

[57] ABSTRACT

Method for controlling desired redox potential in hydrogencontaining protective gases used in high-temperature furnaces in powder-metallurgical processes. A sample of the protective gas is withdrawn from the furnace and the redox potential of the sample measured at the high temperature to produce treated bodies of good quality. Humidifying the gases blowing through the furnace is employed to erase or minimize a deviation of the redox potential of the sample from a predetermined redox potential. Ax oxygen-hydrogen mixture may be obtained by electrolysis of water as a function of the measured redox potential and this mixture may be used for humidification. In this manner good quality end products are assured despite fluctuations in throughput and properties of material entering the furnace.

6 Claims, 1 Drawing Figure

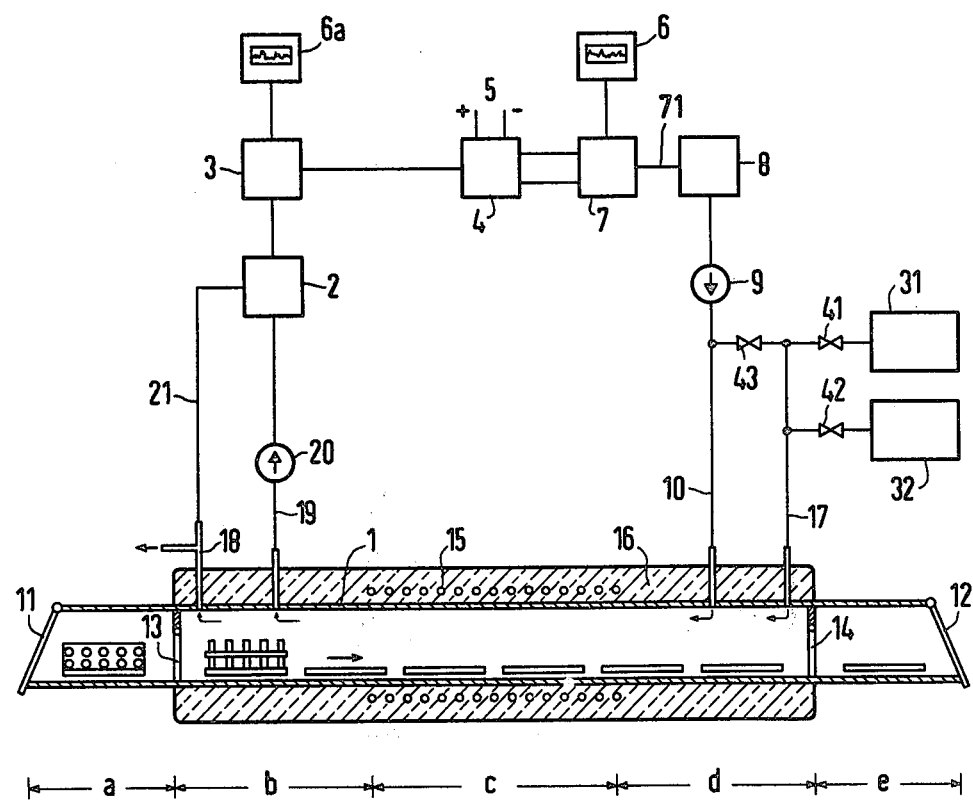

SETTING AND CONTROLLING DESIRED REDOX POTENTIALS IN GASES

BACKGROUND OF THE INVENTION

1. Field of the Invention

This invention relates to a method for setting and controlling desired redox potentials in gases, particularly in hydrogencontaining protective gases which are used in sintering furnaces for oxide-ceramic bodies.

2. Description of the Prior Art

In many powder-metallurgical processes, which are normally carried out in high-temperature furnaces, reducing gas atmospheres are used for ensuring and setting the desired product quality. In almost all cases, these protective gases contain hydrogen gas as the reducing medium. The redox potential of hydrogen is determined, as seen thermodynamically, by the ratio of the hydrogen content to the water content according to the following formula:

$$\Delta G_{O_2} = RT \ln P_{O_2} = 2\Delta G^O{}_T + 2RT\, P_{H_2O}/P_{H_2}$$

where
- $\Delta G$ is the free enthalpy;
- $R$ gas constant;
- $T$ absolute temperature;
- $P_{O_2}$ the partial pressure of oxygen;
- $\Delta G^O$ the free formation enthalpy for $O_2$ under normal conditions (1 atm, 25° C.).

From this it follows that the reducing power of the hydrogen-containing gas can be influenced by the admixture of water. However, this insight has heretofore been used only to the extent that the redox potential was thereby set only approximately to a defined value.

With the further development of powder metallurgy technology it was found that exact setting of the redox potential of the protective gas is of great importance for production of constant, high quality end products.

A problem, however, arose when variations and fluctuations in throughput occurred resulting in changes of the redox potentials of the protective gases and production of varying and inferior quality products. The product throughput is significant inasmuch as water is produced by reduction processes that occur.

In addition to assurance of constant product quality, the setting and controlling of the redox potential should desirably take place in an easily checked and documented manner, independently of the operating personnel.

SUMMARY OF THE INVENTION

An object of the invention is to provide a method for controlling desired redox potentials in hydrogen-containing protective gases used in high-temperature furnaces in powder-metallurgical processes.

With the foregoing and other objects in view there is provided in accordance with the invention a method of treating solid bodies containing oxygen by passing the bodies through a furnace wherein the bodies are subjected to a high temperature in an atmosphere of protective gases containing hydrogen having a predetermined redox potential to produce heated bodies of good quality, flowing countercurrent to the bodies in the furnace, including withdrawing a sample of the protective gas surrounding the bodies undergoing treatment at high temperature in the furnace, measuring the redox potential of the sample of protective gas at the high temperature, and correcting a deviation of the redox potential of the sample from the predetermined redox potential by humidifying the protective gases flowing through the furnace.

Other features which are considered as characteristic for the invention are set forth in the appended claims.

Although the invention is illustrated and described herein as embodied in a method of setting and controlling desired redox potentials in gases, it is nevertheless not intended to be limited to the details shown, since various modifications may be made therein without departing from the spirit of the invention and within the scope and range of equivalents of the claims.

BRIEF DESCRIPTION OF THE DRAWING

The invention, however, together with additional objects and advantages thereof will be best understood from the following description when read in connection with the accompanying drawing in which is diagrammatically illustrated a sintering furnace for treating nuclear fuel pellets in a protective gas atmosphere and a system for controlling the desired redox potential in the hydrogen-containing protective gas.

DETAILED DESCRIPTION OF THE INVENTION

The redox potential of the protective gas is measured preferably continuously, at the temperature that gives good product quality. The redox potential of the protective gases in the furnace is kept at a predetermined setpoint value by appropriate humidification on the input side of the equipment, dependent on and controlled by the measured values. Through this controlwise interlinkage of measured redox potential and controlled humidification, the quality of the end product becomes independent of the throughput. An oxygen/hydrogen mixture can be used for the humidification. The oxygen/hydrogen mixture is fed to the equipment by a part of the protective gas flowing into the latter, and the mixture of oxygen and hydrogen recombines in the furnace chamber to form steam. The quantitative control of this oxygen/hydrogen mixture can be accomplished by means of known dosing devices, but is is particularly advantageous to generate this oxygen/hydrogen mixture by electrolysis, the electrolysis current being controlled as a function of the measured redox potential or of its deviation from the setpoint value.

In the drawing, a method is illustrated by the example of a sintering furnace for nuclear fuel pellets. The furnace 1 represents a known continuous sintering furnace, which is provided in its hot part with thermal insulation 16, in which the heater winding 15 is embedded. The material to be sintered, i.e. in this example, the nuclear fuel pellets, is, after the furnace door 11 is opened, pushed-in on so-called transport boats into the furnace. The boats move in the direction of the arrows and leave the furnace after the flap 12 is lifted. The flaps 13 and 14 divide off the respective end zones a and e of the furnace in order to prevent the ambient air from entering the interior of the furnace. This inner space is divided into the preheating zone a, the reduction zone b, the sintering zone c proper and the cooling zone d. The reducing protective gas is introduced into the cooling zone c through line 17 where the reducing protective gas cools the outgoing material prior to its exit from the furnace and the gas in turn is preheated by the material. The preheated gas flows through the furnace in the direction opposite to the movement of the nuclear fuel pellets and leaves the furnace through line 18. The gas in line 18 then leads to a conventional gas purification system not shown in the drawing. The protective gas fed-in into furnace 1 through line 17 is taken from the supply tanks 31 and 32 with the flow of gas controlled by conventional dosing valves 41 and 42. Supply tank 31 may contain hydrogen as a reducing gas, and supply tank 32 may contain argon or nitrogen or other suitable inert gas.

A sampling line 19 is connected to the furnace zone b in which reduction takes place, which reduction zone e.g., is at a temperature of 700° C. The gas in line 19 is directed by pump 20 to a known measuring cell 2 for the redox potential. The gases leaving measuring cell a are returned through line 21 to the exhaust gas line 18 where they commingle with the gas from furnace 1 and then pass to a gas purification system. Suitable provision is made that the temperature of the gas sample undergoing measurement in the measuring cell 2 is at the temperature at which it is taken off from the furnace chamber. This may be accomplished, for example, by surrounding line 19 with a heating jacket to compensate for radiation losses or by heating means in cell 2. The output signal of the measuring cell is subsequently fed via an amplifier 3 to which a recorder 6a is connected, to a measured-value converter 4, such equipment being conventional. The latter is also connected to a d-c source 5. In addition, there is in this equipment a reference-point value setter for the redox potential to be set. The electrolysis current for the electrolysis cell 7, coming from the d-c source 5, is now adjusted in this measurement value converter 4 as a function of the difference between this reference value and the actual value of the redox potential from the amplifier 3. A recorder 6 continuously records this electrolysis current which is a measure of the state of the redox potential in the interior of the furnace 1. The electrolysis cell 7 contains water acidified with sulfuric acid. The gases, hydrogen and oxygen generated by electrolysis, rise therein to the top of cell 7 and are released through a gas-permeable diaphragm into the line 71. This line 71 leads to a suitable known gas drier 8, from which the dried hydrogen/oxygen mixture flows through line 10 aided by pump 9. This hydrogen/oxygen mixture, into which part of the protective gas released through valve 43 is admixed, is now introduced into the cooling zone d of the furnace chamber 1. Thus, if the redox potential at the measuring cell 2 drops, an increased quantity of the hydrogen/oxygen mixture is supplied to the furnace and recombines in the furnace 1 to form water in very finely dispersed form.

This example serves to illustrate the principle of the method. Depending on the application, modifications are, of course, possible, particularly also with respect to the attachment of the gas sampling line 19, which should for good operation be at the point where the prevailing redox potential of the protective gas is to be determined. In this manner it is possible to keep the protective gas effect constant even if the furnaces are charged unevenly. This has the advantages of not only assurance of good quality of the end products, but in addition is accompanied by a substantial simplification of the production cycle, as now the material that is to be passed through the furnace to be sintered no longer needs to be uniform and constant.

There are claimed:

1. In a method of treating solid bodies containing oxygen by passing the bodies through a furnace wherein the bodies are subjected to a high temperature in an atmosphere of protective gases containing hydrogen having a predetermined redox potential to produce heated bodies of good quality, flowing countercurrent to the bodies in the furnace, the improvement comprising, continuously withdrawing a sample of the protective gas surrounding the bodies undergoing treatment at high temperature in the furnace, continuously measuring the redox potential of the sample of protective gas at the high temperature, and correcting a deviation of the redox potential of the sample from the predetermined redox potential by humidifying the protective gases flowing through the furnace to maintain said atmosphere of protective gases containing hydrogen having a predetermined redox potential.

2. Method according to claim 1, wherein an oxygen/hydrogen mixture is used for humidification.

3. Method according to claim 2, wherein the oxygen/hydrogen mixture is commingled with at least part of the protective gas prior to flowing into the furnace.

4. In a method of treating solid bodies containing oxygen by passing the bodies through a furnace wherein the bodies are subjected to a high temperature in an atmosphere of protective gases containing hydrogen having a predetermined redox potential to produce heated bodies of good quality, flowing countercurrent to the bodies in the furnace, the improvement comprising, continuously withdrawing a sample of the protective gas surrounding the bodies undergoing treatment at high temperature in the furnace, continuously measuring the redox potential of the sample of protective gas at the high temperature, and correcting a deviation of the redox potential of the sample from the predetermined redox potential by humidifying the protective gases flowing through the furnace to maintain said atmosphere of protective gases containing hydrogen having a predetermined redox potential, and wherein an oxygen/hydrogen mixture is used for humidification, and wherein the oxygen/hydrogen mixture is generated by electrolysis of water and the electrolysis current is controlled as a function of the measured redox potential.

5. Method according to claim 4, wherein the electrolysis current is controlled as a function of the deviation of the redox potential of the sample from the predetermined redox potential.

6. Method according to claim 1, wherein the sample of protective gas continuously withdrawn from the furnace is after measurement of its redox potential commingled with protective gas discharged from the furnace.

* * * * *